(No Model.) 2 Sheets—Sheet 1.
L. C. CHRISTIE.
TESTING APPARATUS.
No. 603,874. Patented May 10, 1898.
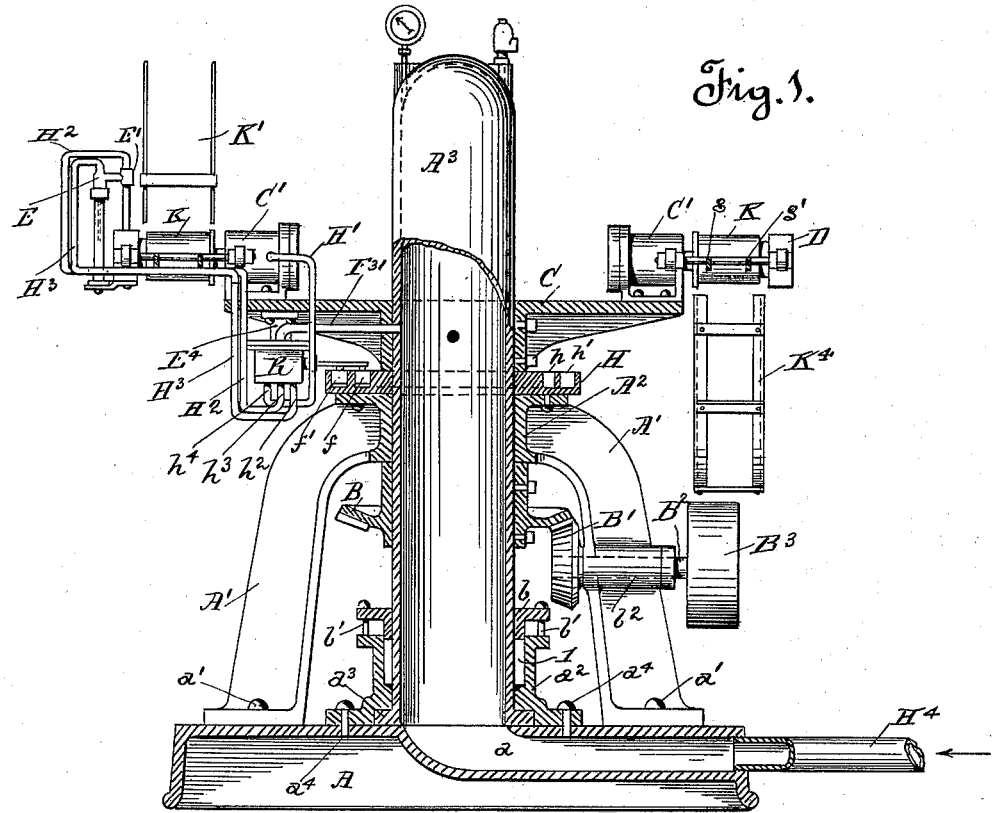
Fig. 1.
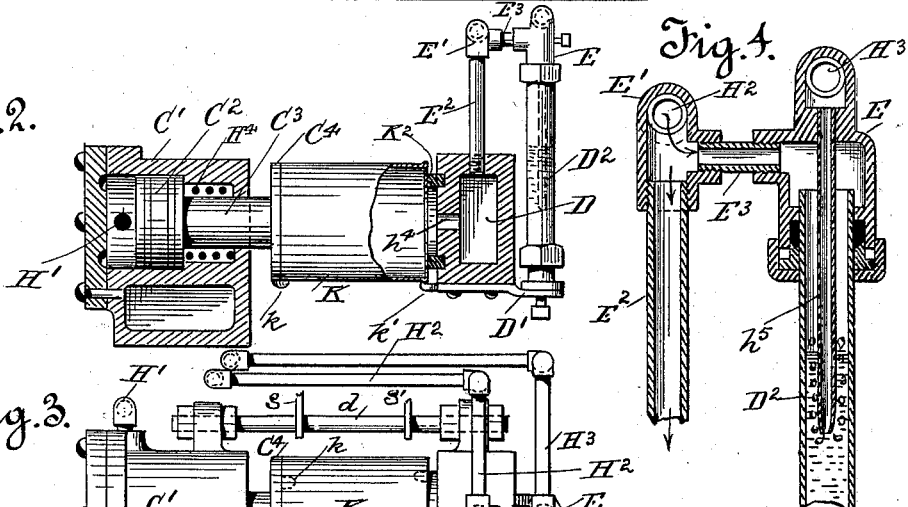
Fig. 2. Fig. 3. Fig. 4.
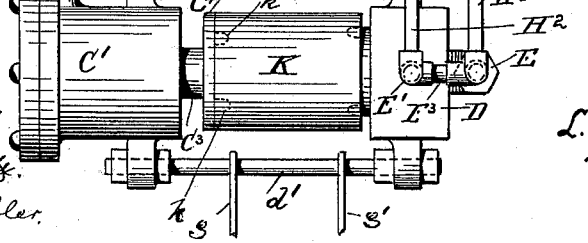
Witnesses.
Inventor.
L. C. Christie
by N. A. Acker
atty.

(No Model.)　　　　　　　　　　　　　　　　　　　2 Sheets—Sheet 2.
L. C. CHRISTIE.
TESTING APPARATUS.
No. 603,874.　　　　　　　　　　　　　Patented May 10, 1898.
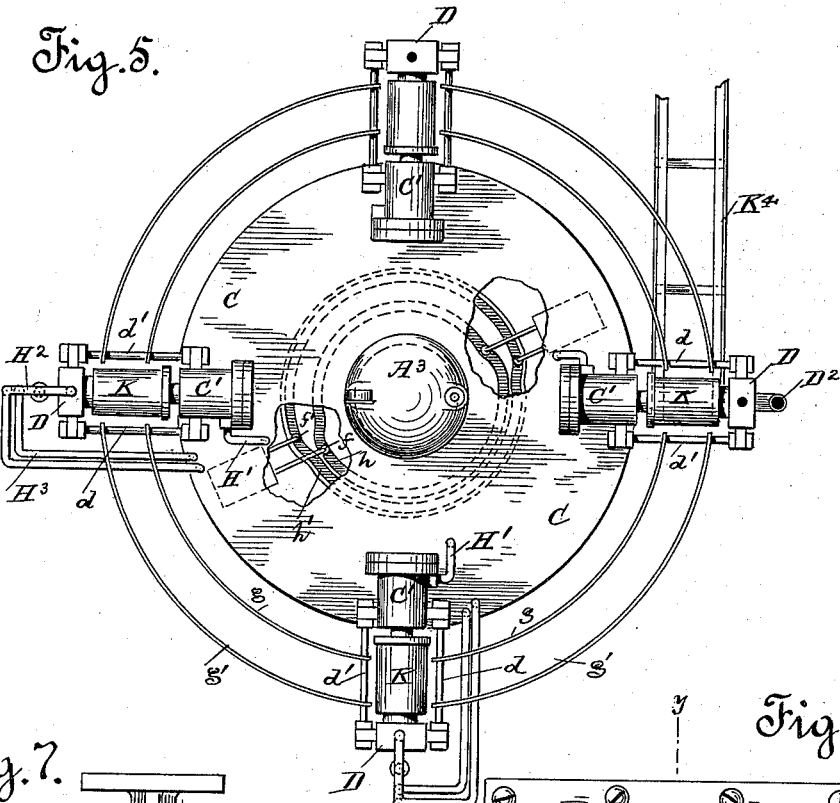
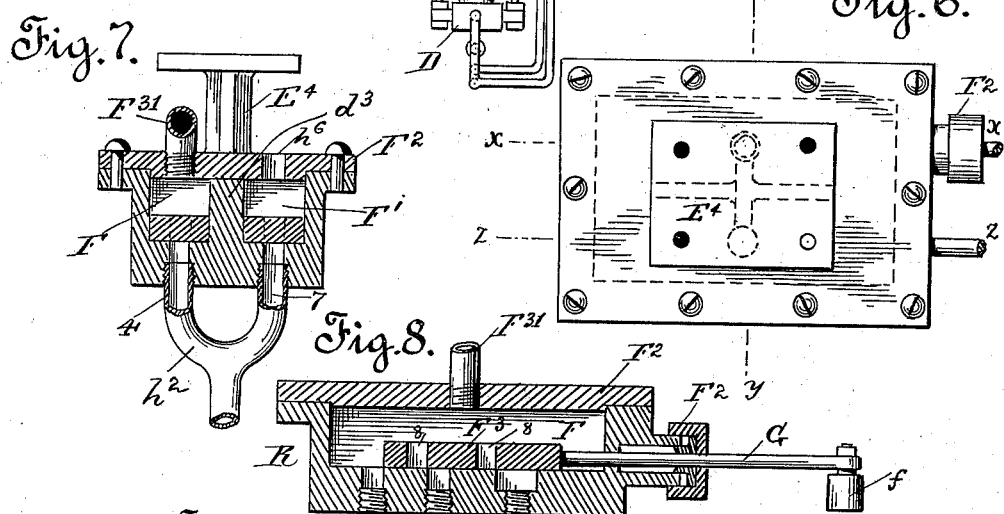
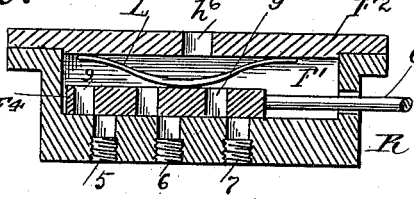
Witnesses.　　　　　　　　　　　　　　　　　　Inventor.

UNITED STATES PATENT OFFICE.

LOUIS C. CHRISTIE, OF SAN FRANCISCO, CALIFORNIA.

TESTING APPARATUS.

SPECIFICATION forming part of Letters Patent No. 603,874, dated May 10, 1898.

Application filed June 5, 1896. Serial No. 594,352. (No model.)

*To all whom it may concern:*

Be it known that I, LOUIS C. CHRISTIE, a citizen of the United States, residing at San Francisco, in the county of San Francisco and State of California, have invented certain new and useful Improvements in Testing Apparatus; and I do hereby declare that the following is a full, clear, and exact description thereof.

The present invention relates to a certain new and useful can or vessel testing apparatus, which consists in the novel arrangements of parts and details of construction, as will be hereinafter fully set forth in the drawings and described and pointed out in the specification.

The object of the invention is to provide a simple and inexpensive apparatus for the testing of cans or other vessels without bringing the can or vessel to be tested into direct contact with a liquid bath; and the invention consists more particularly in the peculiar mechanism for clamping the can or vessel to be tested and releasing the same after being tested and in the mechanism for indicating whether the can or the vessel is a perfect or an imperfect one, and, further, in the mechanism for controlling the supply of air from the air-reservoir to operate the respective parts of the can or vessel clamping and indicating mechanism.

In order to fully understand the invention, reference must be had to the accompanying sheets of drawings, forming a part of this application, wherein—

Figure 1 is a side view in elevation of the testing apparatus, partly in section. Fig. 2 is a detail side view in elevation, partly in section, showing one of the can or vessel clamping devices and the indicator for the same. Fig. 3 is a top plan view of the mechanism illustrated by Fig. 2. Fig. 4 is an enlarged detail sectional view, partly broken away, of the indicator and its air-supply connection, showing the pipe for supplying air to fill the can or vessel to be tested. Fig. 5 is a top plan view of the testing apparatus. Fig. 6 is a similar view of the air supply and exhaust chamber. Fig. 7 is a cross-sectional end view in elevation, taken on line $y\,y$, Fig. 6. Fig. 8 is a longitudinal sectional view in elevation, taken on line $x\,x$, Fig. 6; and Fig. 9 is a similar view taken on line $z\,z$, Fig. 6.

In the drawings the letter A is used to indicate the base-plate of the machine, which plate is formed with an air passage-way $a$. To this plate are secured by bolts $a'$ the supporting-arms A′, which arms (three in number) are connected at their upper end to the hub $A^2$. Through this hub extends and works the vertical air-reservoir $A^3$, which reservoir is secured at its lower end by means of the flanged gland $a^2$ to the base-plate A. The gland $a^2$ rests upon the flange $a^3$ of the air-reservoir and is attached to the base-plate by the bolts $a^4$. In order that communication may be established between the air-reservoir and the air passage-way, a central opening, as shown, is formed in the base-plate A. Consequently the air forced into the air passage-way $a$ flows into the air-reservoir. An airtight joint is made between the gland $a^2$ and the air-reservoir by means of the follower $b$, which is connected to the gland $a^2$ by the bolts $b'$. The opening 1 between the gland and the air-reservoir is filled with any suitable packing material.

To the air-reservoir, below the hub $A^2$, is bolted, keyed, or otherwise fastened the bevel-gear B, which meshes with the bevel-pinion B′, secured upon the drive-shaft $B^2$. This drive-shaft works within bearing-box $b^2$, attached to one of the supporting-arms A′, Fig. 1, and to the outer end of said shaft is secured the belt-wheel $B^3$, which is driven by means of a belt (not shown) in order to drive the shaft $B^2$. The motion of this shaft is transmitted to the air-reservoir through the medium of the bevel-pinion B′ and the bevel-gear B.

Upon the reservoir $A^3$ a short distance above the hub $A^2$ is keyed, bolted, or otherwise secured the table C, which table is rotated or carried around by the movement of the said air-reservoir. To the upper face of this table, near its outer edge, is secured a series of air-cylinders C′, (four in the present machine,) within which works the piston $C^2$. The piston-rod $C^3$ extends beyond the air-cylinder C′ and has secured to its outer end the can or vessel clamping head $C^4$. A short distance beyond and in line with the air-cylinder $C'$ is located the box D, which is connected to the air-cylinder and supported by means of the tie-rods $d\ d'$, Figs. 3 and 5. From each box D outwardly projects the bracket or arm $D'$, which supports and to which is secured the vertical indicator or water-gage $D^2$. To the upper end of this indicator or water-gage is secured the coupling E, which connects with the coupling $E'$, secured to the upper end of the pipe $E^2$, projecting from the box D, by means of the short cross-pipe $E^3$.

To the under face of the table C, near its outer edge, is secured, by brackets $E^4$, a series of valve-boxes R, each of which is divided by the partition $d^3$, so as to form an air-inlet chamber F and an air-exhaust chamber $F'$. Through the cover $F^2$ of the valve-boxes R extends the pipe $F^{31}$, which leads from the air-reservoir $A^3$, Figs. 1, 7, and 8. The bottom of the air-chamber F is provided with the outlet-ports 2, 3, and 4 and that of the exhaust-chamber with inlet-ports 5, 6, and 7. The outlet-port 4 is twice the diameter of that of the ports 2 and 3. Within the chamber F works the slide-valve $F^3$, which is provided with a series of openings 8, and within the chamber $F'$ works the slide-valve $F^4$, provided with openings 9, which register with the inlet-ports 6 5 7 of the exhaust-chamber. From the slide-valve $F^3$ projects through the inner wall of the air-inlet chamber the stem G, to the outer end of which is secured the depending roll $f$, and from the slide-valve $F^4$ likewise projects the stem $G'$, to which is secured the depending roll $f'$. The valve-stem G works through a stuffing-box $f^2$, Fig. 8, so as to prevent the escape of air from within the air-chamber F.

The depending roll $f$ of the valve-stem G works or travels within the eccentric groove $h$, cut in the face of the circular cam-plate H, and the roll $f'$ of the valve-stem $G'$ within the eccentric groove $h'$ of said cam-plate. This cam-plate is located between the hub $A^2$ and the plate or table C, said plate being fastened to the hub $A^2$.

The outlet-port 4 and the inlet-port 7 of the valve-boxes R are connected by the Y-coupling $h^2$, and the port 3 and the port 6 by the Y-coupling $h^3$, and the port 2 with the port 5 by the Y-coupling $h^4$. From the Y-coupling $h^4$ extends the pipe $H'$, which communicates with the air-cylinder $C'$ immediately in front of the piston-head $C^2$. The Y-shaped coupling $h^3$ is connected with the coupling $E'$ by means of the pipe $H^2$, while the Y-shaped coupling $h^2$ is connected to the coupling E by the pipe $H^3$, Fig. 3. This pipe communicates with the small tapered pipe $h^5$, which extends a distance into the gage $D^2$.

To the passage-way $a$ is connected the air-supply pipe $H^4$, which pipe connects with an air-compressor. (Not shown.) The air from the compressor is thus conveyed to the air-reservoir $A^3$, from which it escapes through the pipes $F^{31}$ into the air-chambers F.

Each tie-rod $d\ d'$ is connected by the circular plates or rods $g\ g'$, which form a track for supporting or holding the cans K within the feed-chute $K'$ until the open portion of the clamping mechanism is moved beneath the feed-chute. As the open portion of the clamping mechanism is moved beneath the feed-chute the can or vessel drops from the feed-chute between the tie-rods resting upon the fingers $k\ k'$, projecting from the box D and clamping-head $C^4$, Fig. 2. These fingers support the can or vessel between and in line with the clamping mechanism.

During the operation of the machine the slide-valves $F^3$ and $F^4$ are moved in and out in order to close and open the escape and inlet ports of the valve-boxes during the travel of the rolls $f\ f'$ within the eccentric grooves of the cam-plate H. As the plate or table is carried around by the rotation of the air-reservoir, the roll $f$, moving within the inwardly-inclined portion of the eccentric groove $h$, gradually draws the slide-valve $F^3$ outward. As the said slide-valve is moved outward the outlet-port 2 is first opened, Fig. 8. The moment this port opens the air forced within the chamber F from the air-reservoir escapes through the said port and is conveyed by the pipe $H'$ to the air-cylinder $C'$ immediately behind the piston-head $C^2$. The air as forced behind the piston-head moves the said head outward and forces the piston-rod carrying the clamping-head toward the air-box D. During this movement of the clamping-head the can or vessel to be tested is delivered from the feed-chute $K'$ between the clamping-head $C^4$ and the outer face of the air-box D, resting upon the fingers $k\ k'$. By the time the port 2 is fully opened the clamping-head $C^4$ will have moved its full outward distance and the can or vessel K will be firmly held between the said clamping-head and the packing ring or gasket $K^2$, secured to the outer face of the air-box D, the open end of the can being nearest to the face of the said air-box. After the port 2 is uncovered the slide-valve continues its outward movement, so as to wholly uncover or open port 3 and open or uncover one-half of port 4. These ports being uncovered, as described, the air contained within the chamber F escapes therethrough, that passing through port 3 being conveyed to the air-box D by means of the pipe $H^2$ and escaping through the outlet-opening $h^4$, formed in the face of said air-box, enters within and fills the can or vessel K with air under pressure, the surplus air completely filling the air-box D, the pipe $E^2$, and the couplings $E^3$ and E, while the air escaping through the port 4 is conveyed to the water gage or indicator by the pipe $H^3$. When the parts described stand filled with air, there will be an even pressure. The slide-valve continuing its outward movement, the port 3 is gradually closed, and when the said valve has made its full outward stroke the port 3 will be completely closed, but the port 4 will still remain part way open for the reason that its opening being double the diameter of the port 3 it will remain one-half uncovered, while the said port 3 is completely closed. The pressure will with the slide-valve in this position be equally distributed, and no disturbance will be created or noted by the water gage or indicator if the vessel filled with air under pressure is a perfect one. If, however, the vessel has a leak therein, the air escaping therefrom will reduce the pressure of the retained air, which can be resupplied only by the air flowing through the port 4, port 3 being closed. The air forced through this port to reach the vessel must of necessity flow through the water gage or indicator, which will cause bubbles to be created in the water of the gage or indicator and notify the attendant that the vessel is a leaky one. As the roll $f$ moves with the outwardly-inclined portion of the groove $h$ after the vessel has been tested the slide-valve $F^3$ is forced inward, so as to cover or close the ports 2, 3, and 4, in order to cut off the supply of air to the respective parts. The moment the ports 2, 3, and 4 are closed the roll $f'$, depending from the stem $G'$ of the slide-valve $F^4$, travels within the inwardly-inclined portion of the eccentric groove $h'$ of the cam-plate H and gradually draws the slide-valve $F^4$ outward, so as to uncover the ports 5, 6, and 7, respectively, of the exhaust-chamber $F'$. These ports being opened the air-pressure is released, and the air contained within the air-cylinder, clamped vessel, air-box, and pipes rushes backward into the exhaust-chamber through the open ports 5, 6, and 7 and escapes from said chamber through the outlet-opening $h^6$, formed in the top thereof. As the pressure upon the piston-head within the air-cylinder is released the resiliency of the spring $H^4$, located between the piston-head and the end of the air-cylinder, Fig. 2, serves to force the piston-head inward, which, carrying therewith the piston-rod $C^3$ and the clamping-head $C^4$, releases the clamped vessel in order that the same may be discharged into the discharge-chute $K^4$. During the travel of the can-clamping mechanism from the discharge-chute to the feed-chute the roll $f'$ will travel within the outwardly-inclined portion of the groove $h'$, and the slide-valve $F^4$ will be forced inward in order to close the ports 5, 6, and 7. The slide-valve $F^4$ is maintained upon its seat by the pressure of the flat spring L, located within the exhaust-chamber, Fig. 9.

In the present machine I do not make use of a tester bath or tank containing a liquid bath within which the can to be tested is submerged. Consequently it is not necessary that the tested cans be run through a drying apparatus. The device being a dry tester, in contradistinction to a wet tester, or those making use of a tester-bath, I do not wish to be understood by the expression an "indicator or indicating device" as meaning or claiming a tester-bath within which the can to be tested is submerged, but wish to be understood as claiming any indicating mechanism for denoting a leaky can or vessel other than a tester or liquid bath.

I am aware that it is old in the art to construct a dry tester wherein the cans or vessels are tested by the vacuum process, such a machine being fully shown and described in Letters Patent of the United States No. 498,408, granted to G. Roth, May 30, 1893, for an improved can-testing machine, and I do not claim or wish to be understood as claiming a machine for testing cans by the vacuum process, and such a style of can-testing machinery is hereby expressly disclaimed by me.

Having thus described my invention, what I claim as new, and desire to secure protection in by Letters Patent, is—

1. In a can-testing machine, the combination with means for clamping the can in place, an air-supply to the interior of the can, an indicating device, a connection between the air-supply and indicating device, and a separate connection between the indicating device and interior of the can, substantially as described.

2. In a can-testing machine, the combination with can-holding means, a source of air-supply, a pipe leading therefrom and discharging into the can, a supplemental conduit communicating with the air-supply and the said pipe in advance of the discharge end thereof, and an indicator controlled by the air-pressure through the supplemental conduit, substantially as described.

3. In a can-testing machine, the combination with can-holding mechanism, of an air-conductor arranged to communicate with the interior of the can, an indicator communicating with the conductor and actuated by the air passing therethrough during its passage to the can, and an air-supply from which the conductor leads, substantially as described.

4. In a dry testing apparatus, the combination with the vessel-clamping mechanism, of the air-cylinder, a piston working in said cylinder, a piston-rod connecting said piston with one of the clamping-heads, connection between the air-cylinder and a source of air-supply for conveying air within the air-cylinder so as to force the piston outward in order to cause the clamp-head operated thereby to clamp the vessel, devices for breaking the air-pressure within the cylinder, and of the spring located within the air-cylinder which forces the piston inward to release the clamped vessel the moment the air-pressure is released, substantially as described.

5. In a testing apparatus, the combination with the vessel-clamping and air-filling mechanism for the vessels, of the valve-box divided into an air-inlet and an air-outlet chamber, connection between the said clamping and filling mechanism and the air inlet and outlet chambers, an indicator communicating with the filling and the air inlet and outlet chambers, the slide-valves controlling the ports of the air inlet and outlet chambers, and of devices for operating said slide-valves to open and close the said ports, substantially as described.

In testimony whereof I affix my signature, in presence of two witnesses, this 29th day of May, 1896.

LOUIS C. CHRISTIE.

Witnesses:
N. A. ACKER,
LEE D. CRAIG.